(12) United States Patent
Cerri et al.

(10) Patent No.: US 10,412,561 B2
(45) Date of Patent: Sep. 10, 2019

(54) CONTROLLING OPERATION OF COMPUTING DEVICES

(71) Applicant: International Business Machines Corporation, Armonk, NY (US)

(72) Inventors: Fabio Cerri, Rome (IT); Alice Guidotti, Rome (IT); Leonardo Rosati, Rome (IT); Elia Tufarolo, Tarquinia (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/025,093

(22) Filed: Jul. 2, 2018

(65) Prior Publication Data

US 2019/0124492 A1 Apr. 25, 2019

Related U.S. Application Data

(63) Continuation of application No. 15/789,117, filed on Oct. 20, 2017, now Pat. No. 10,080,117.

(51) Int. Cl.
| | |
|---|---|
| *H04M 3/42* | (2006.01) |
| *H04W 4/50* | (2018.01) |
| *H04W 12/06* | (2009.01) |
| *G06F 9/445* | (2018.01) |

(Continued)

(52) U.S. Cl.
CPC .......... *H04W 4/50* (2018.02); *G06F 9/44505* (2013.01); *H04L 63/0823* (2013.01); *H04W 12/06* (2013.01); *H04W 64/00* (2013.01)

(58) Field of Classification Search
CPC ..... H04W 48/18; H04W 24/02; H04W 48/16; H04W 4/24; H04W 88/06; H04W 48/17; H04W 36/14; H04W 28/24
See application file for complete search history.

(56) References Cited

U.S. PATENT DOCUMENTS

| | | |
|---|---|---|
| 8,387,141 B1 | 2/2013 | Zhukov et al. |
| 8,774,755 B1 | 7/2014 | Baker et al. |
| 8,929,857 B2 | 1/2015 | Baker et al. |

(Continued)

FOREIGN PATENT DOCUMENTS

| | | |
|---|---|---|
| CN | 103108082 | 5/2013 |
| WO | WO2014035706 | 3/2014 |

OTHER PUBLICATIONS

Notice of Allowance (dated May 17, 2018) for U.S. Appl. No. 15/789,117, filed Oct. 20, 2017.

*Primary Examiner* — Ronald Eisner
(74) *Attorney, Agent, or Firm* — Schmeiser, Olsen & Watts, LLP; Mark Vallone

(57) ABSTRACT

A method and system for controlling operation of a computing device. One or more applicable settings among settings of one or more features of the computing device are determined. The settings are indicated by policies provided by two or more providers according to priorities of corresponding providers for application of corresponding policies of the providers. The policies include an indication of corresponding settings of the one or more features of the computing device. The providers are validated with at least one authority. The at least one authority certified the priorities of the providers and permissions of the providers to set the features of the policies. The computing device is configured to operate according to the applicable settings of the features.

20 Claims, 8 Drawing Sheets

(51) Int. Cl.
*H04L 29/06* (2006.01)
*H04W 64/00* (2009.01)

(56) References Cited

U.S. PATENT DOCUMENTS

| | | | |
|---|---|---|---|
| 2009/0049518 A1* | 2/2009 | Roman | H04L 41/0893 |
| | | | 726/1 |
| 2012/0149337 A1 | 6/2012 | Singh et al. | |
| 2014/0344922 A1 | 11/2014 | Lam et al. | |
| 2015/0350105 A1* | 12/2015 | Nagarajan | H04L 47/80 |
| | | | 709/225 |

* cited by examiner

CONTROLLING OPERATION OF COMPUTING DEVICES

This application is a continuation application claiming priority to Ser. No. 15/789,117, filed Oct. 20, 2017.

TECHNICAL FIELD

The present invention relates generally to information technology, and more specifically to control of operation of computing devices.

BACKGROUND

Computing devices may be used in multiple modes. An example of a computing device is a mobile (computing) device such as a smartphone, of an employee of a company, that may be used either for personal or business purposes, which reduces a proliferation of the computing devices, with the possibility of using a single computing device for different purposes thereof. However multi-mode usage of the computing device generally requires differentiating operation of the computing device accordingly. For example, when the smartphone is used for personal purposes, the corresponding costs should be billed to an account of the smartphone's user. Conversely, when the smartphone is used for business purposes, the corresponding costs should be billed to an account of the company.

For this multi-mode usage of the computing device, it is possible to configure each computing device with different profiles (or personas) according to each computing device's usage mode, so that each profile allows using the computing device with each computing device's features that are set according to the intended usage thereof. Moreover, it is possible to have different environments for the same persona but with corresponding passwords. The different environments have different user interfaces, which facilitates differentiating the usage modes of the computing device.

Another possibility is of enforcing policies onto a mobile device according to sensor data provided by one or more context sensors (for example, placing the mobile device in silent mode in a specific position), so that the behavior of the mobile device self-adapts to difference contexts. Moreover, a plurality of roles may be assigned to different user types. When the mobile device is within a locale, the role of a user of the mobile device is determined and a policy for the locale corresponding to the role of the user is applied to control one or more features of the mobile device accordingly. In this way, the mobile devices may be treated differently according to the roles of their users.

A mobile device may also have multiple management agents, which receive and enforce policies on the mobile device from external management authorities. A policy manager may be provided on the mobile device to consolidate the policies based on a current state thereof. The policy manager provides a mechanism for regulating a hierarchy of the management authorities. The management authorities may be ranked in order of the trust associated with a vendor providing the software of the management authorities.

Management systems are also used in general to manage endpoints of a data processing environment. Particularly, in a management system based on policies, each policy indicates one or more activities that have to be executed on corresponding endpoints to make the one or more activities compliant with the policy. A management server deploys the policies to the endpoints. Each endpoint directly verifies each endpoint's compliance with the policies and enforces corresponding activities to remedy any non-compliance.

The policies are managed with a centralized approach (wherein the policies are basically, defined and distributed with a client/server architecture), which may not be completely satisfactory in specific scenarios (e.g., when mobile devices are involved).

Indeed, the mobile devices are nomadic for the nature of the mobile devices. Therefore, the mobile devices may transit across a number of domains.

The mobile devices may be exposed to different contexts. Moreover, these different contexts generally change dynamically over time.

The mobile devices may support several communication channels which may not be always available (at any time/position).

SUMMARY

Embodiments of the present invention provide a method, and associated computing system and computer program product, for controlling operation of a computing device. The computing device receives an indication of policies provided by providers having corresponding priorities. The policies include an indication of corresponding settings of one or more features of the computing device. The providers are validated with at least one authority having certified the priorities and permissions of the providers to set the features of the policies. The computing device determines one or more applicable settings among the settings of the features of the policies according to the priorities of the corresponding providers. The computing device configures the computing device to operate according to the applicable settings of the features.

DETAILED DESCRIPTION

FIG. 1A-1D show embodiments of the present invention.

Figure 1A:
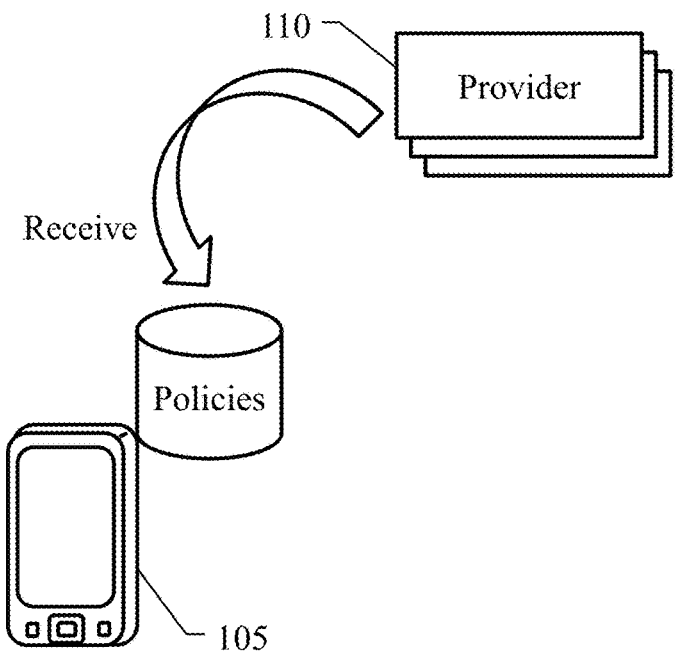
FIGS. 1A-1D show embodiments of the present invention.

Starting from FIG. 1A, operation of a computing device (for example, a smartphone 105) is to be controlled (in order to define behavior of the smartphone 105). The smartphone 105 receives a plurality of policies. Each policy indicates a setting of one or more features of the smartphone 105 (for example, ringtone mode, file access, cost billing, call filtering). The policies are provided by a plurality of providers 110. The providers 110 are any stakeholders having an interest in the control of the smartphone 105 (for example, a user of the smartphone 105, one or more remote entities such as a company employing the user, governmental protection). The providers 110 have corresponding priorities for the application of policies of the providers 110 (for example, priorities that are dynamic and may change depending on factors such as time, position, events).

Figure 1B:
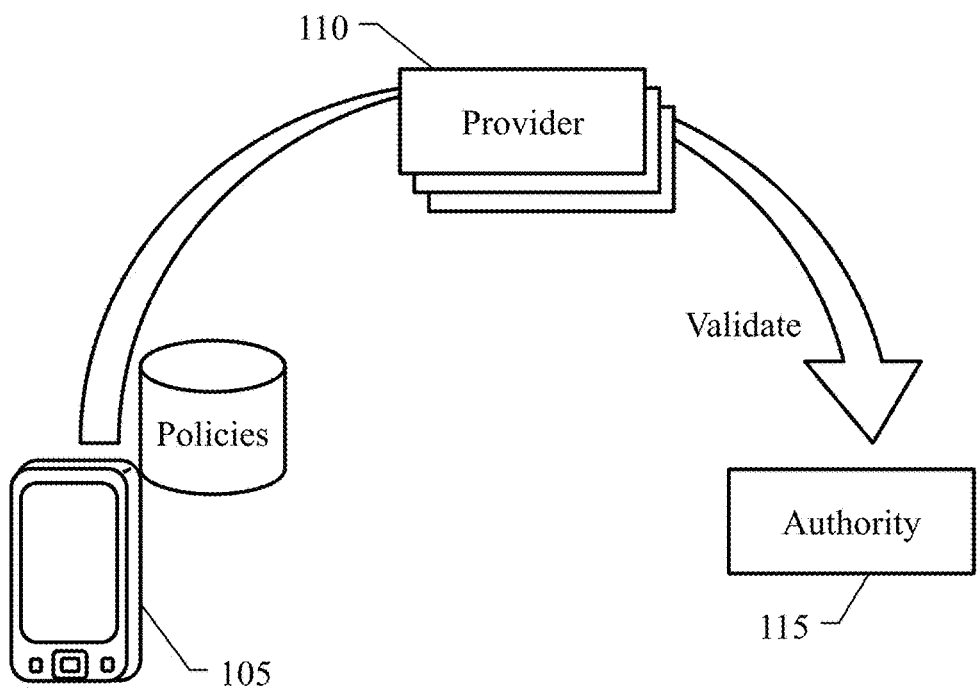

Moving to FIG. 1B, the providers 110 are enrolled (registered) with an authority 115, or with a plurality of authorities comprising the authority 115. The authority 115 is any entity (e.g., a public institution) having the power (accepted by the user of the smartphone 105) to authorize the operations that may be performed by the providers 110. For each provider 110, the authority 115 validates priority and permissions of the provider 110 to set the features of the corresponding policies (for example, by means of a digital certificate of the provider 110 that is issued by the authority 115).

Figure 1C:
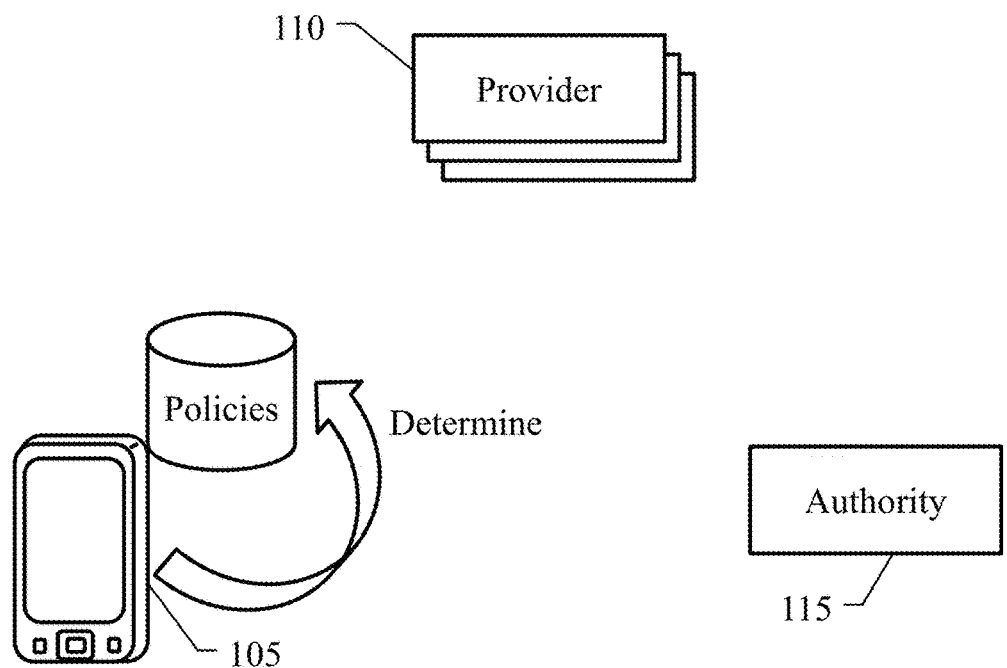

Moving to FIG. 1C, one or more applicable settings of the smartphone are determined among the settings of the features of the policies. The applicable settings are determined according to the priorities of the corresponding providers 110 that have been validated. For example, the applicable settings are selected among the policies (of the validated providers 110) that are independent or that have fulfilled dependencies (for example, based on enablement, time, position, events). For any feature having two or more conflicting settings, the one feature in the policy of the provider 110 with the highest (current) priority is selected.

Figure 1D:
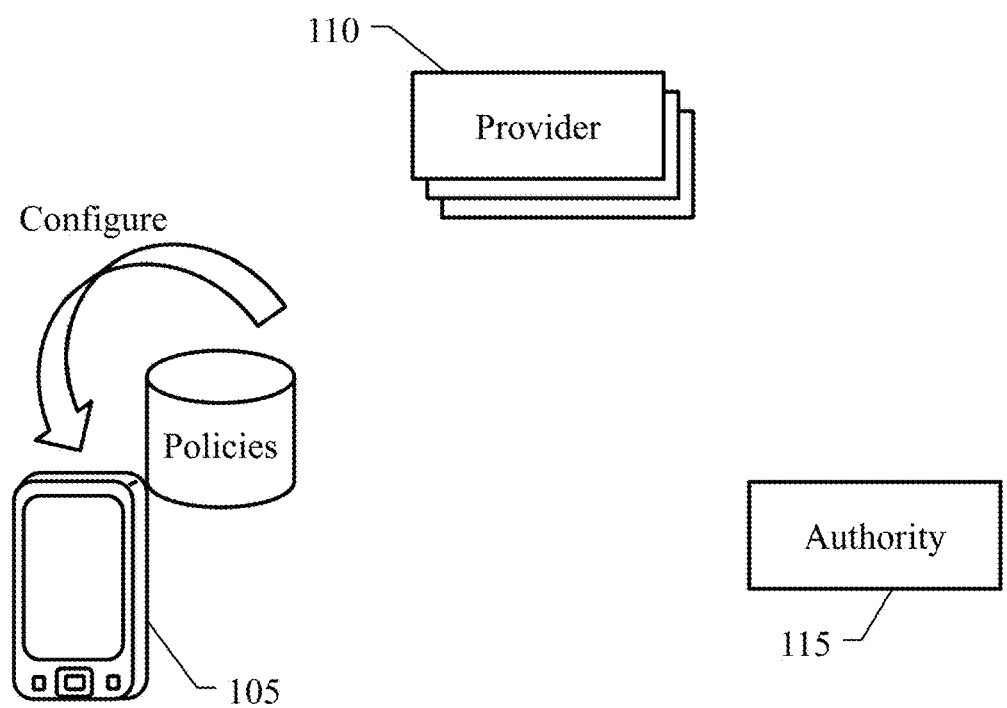

Moving to FIG. 1D, the smartphone 105 is configured to operate according to the applicable settings of the features. For example, the corresponding costs are billed to an account of the company of the user during the user's working hours and to an account of the user outside the user's working hours (according to a policy of the company). Moreover, if the smartphone 105 enters a restaurant, the ringtone of the smartphone 105 is lowered (according to a corresponding policy) and if a natural disaster occurs in the area of the smartphone 105, the camera of the smartphone 105 is disabled (according to a policy of governmental protection).

The above-described description of FIGS. 1A-1D provides a decentralized approach, wherein the authorizations of the providers and the definition of the policies (and deployment of the policies) are decoupled, so that any number of providers (and then any number of policies) may be provided and deployed in different ways. Indeed, the providers only need to be certified by the authority. Each provider may then define any policies (as long as the policies do not violate permissions granted to the provider 110) and deploy the policies. As a result, the features of the present invention described in FIGS. 1A-1D are highly flexible and scalable, and are particularly advantageous in case of mobile devices (such as smartphones) which may transit across a number of domains, may be exposed to dynamic contexts, and may support several communication channels.

Figure 2:
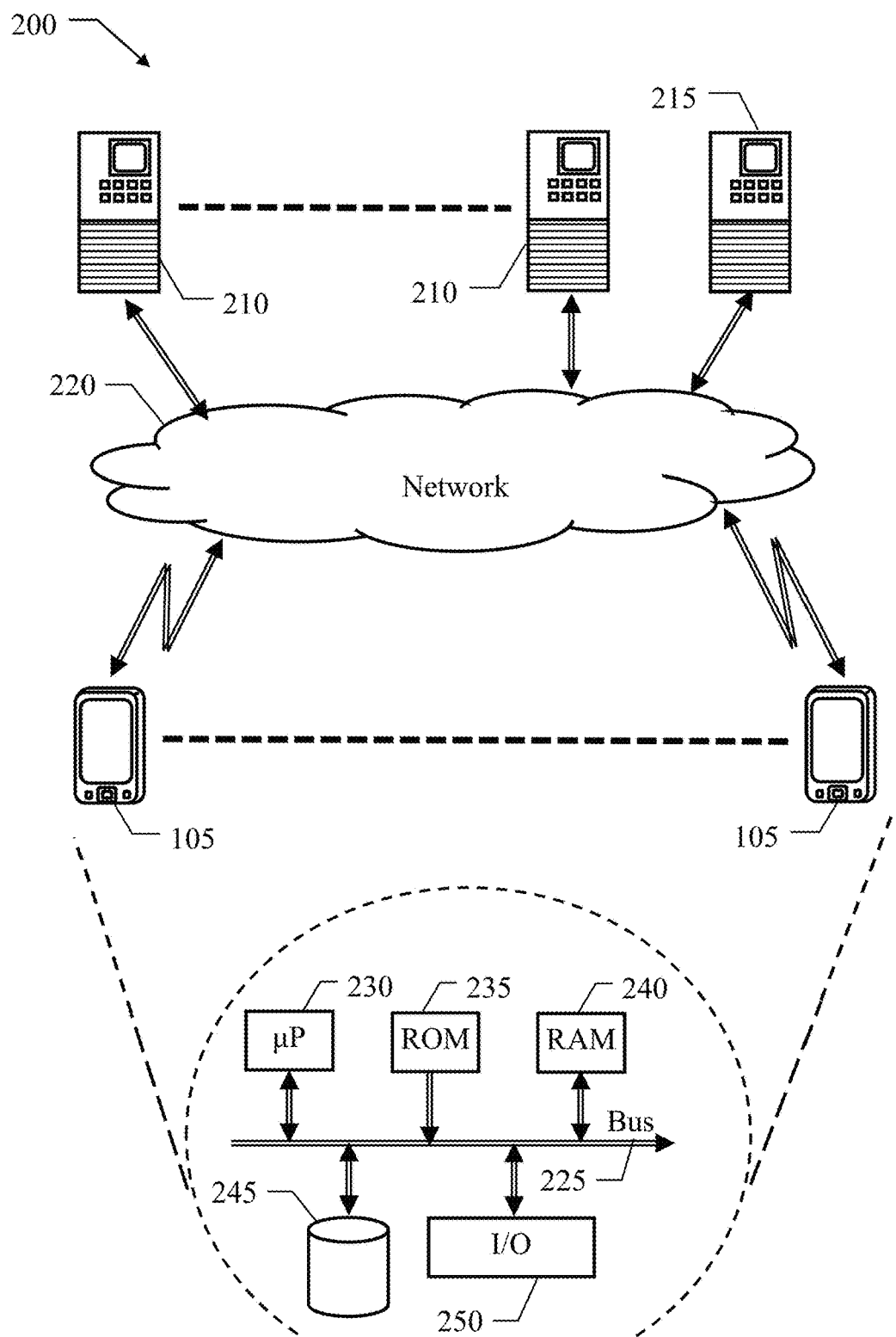
FIG. 2 shows a computing system which implements embodiments of the present invention.

FIG. 2 shows a computing system 200 which implements embodiment of the present invention.

The computing system 200 comprises one or more of the above-mentioned computing devices, for example, smartphones 105 (whose operation is to be controlled). Moreover, the computing system 200 comprises one or more computing machines; for example, provider servers 210 of the providers (provider servers) and at least one computing machine, for example, an authority server 215 of the authority (authority server). The smartphone 105, the provider servers 210 and the authority server 215 communicate via a telecommunication network 220 (for example, based on the Internet). The smartphone 105 may access the telecommunication network 220 through mobile telephone networks, wireless access points (for example, of Wi-fi type), proximity apparatuses (for example, of Near-Field Communication (NFC) type), whereas the provider servers 210 and the authority server 215 may access the telecommunication network 220 through a cabled connection.

Each computing component of the above-described computing components of the computing system 200 (i.e., the smartphones 105, the provider servers 210 and the authority server 215) comprises several units that are connected among the computing components, for example, through a bus structure 225 with one or more levels. Particularly, one or more microprocessors (µP) 230 control operation of the computing component; a non-volatile memory (ROM) 235 stores basic code for a bootstrap of the computing component and a volatile memory (RAM) 240 is used as a working memory by the microprocessors 230. The computing component is provided with a mass-memory 245 for storing programs and data (for example, flash memories for the smart-phones 105 and storage devices of server farms wherein the provider servers 215 and the authority server 15 are implemented). Moreover, the computing component comprises a number of controllers 250 for peripheral, or Input/Output (I/O), units; for example, the peripheral units of the smartphones 105 comprise a touch-screen, a mobile telephone transceiver (TX/RX) such as of the 4G type, a Wireless Network Interface Card (WNIC) such as of the Wi-Fi type, a proximity transceiver such as of the NFC type, a camera, a microphone, a loudspeaker and a GPS receiver, whereas the peripheral units of the provider servers 210 and of the authority server 215 comprise a NIC and a drive for reading/writing removable storage units (such as optical disks, like DVDs) implemented by consoles of the corresponding server farms.

Figure 3:
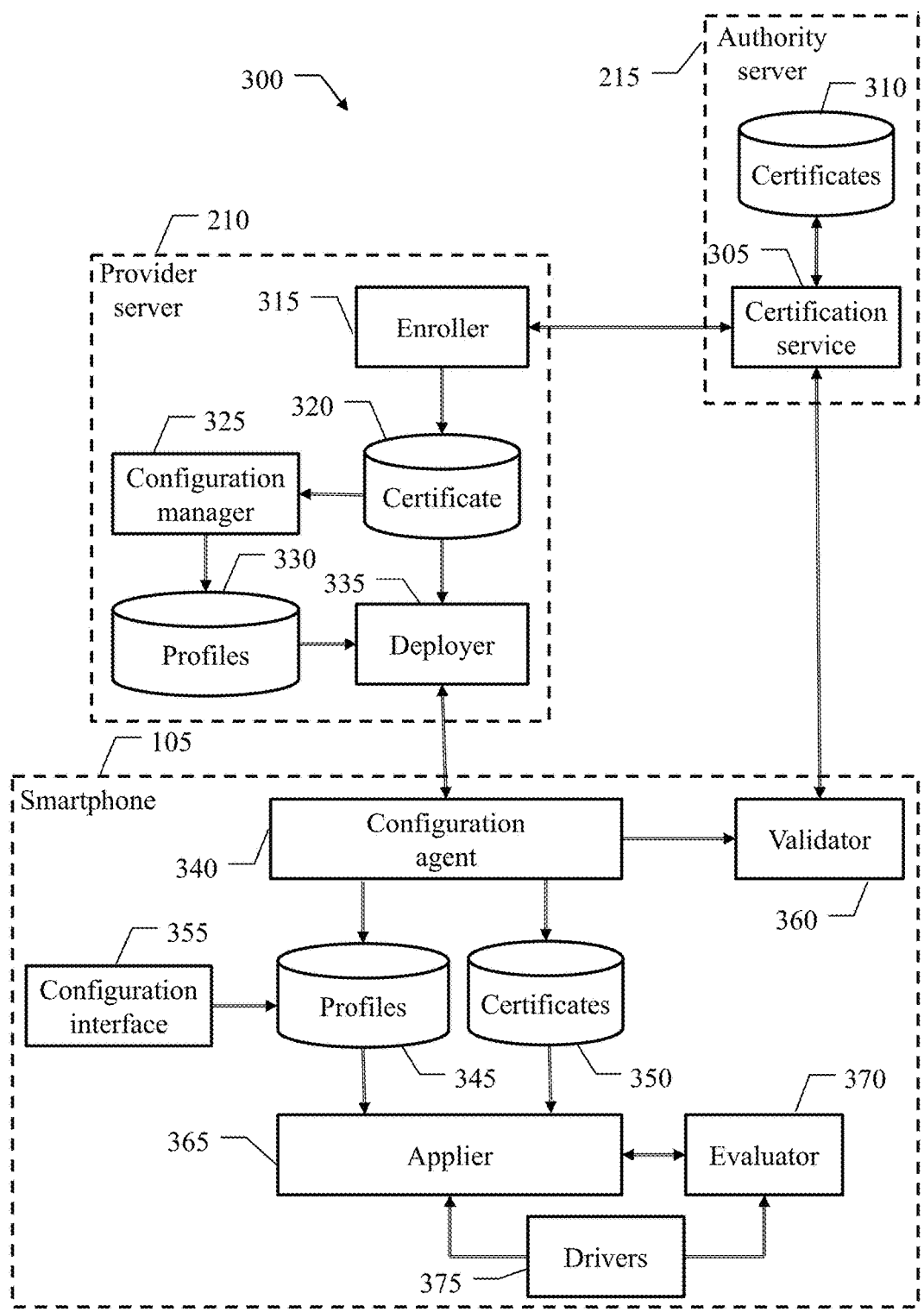
FIG. 3 shows software components used to implement embodiments of the present invention.
Figure 4A:
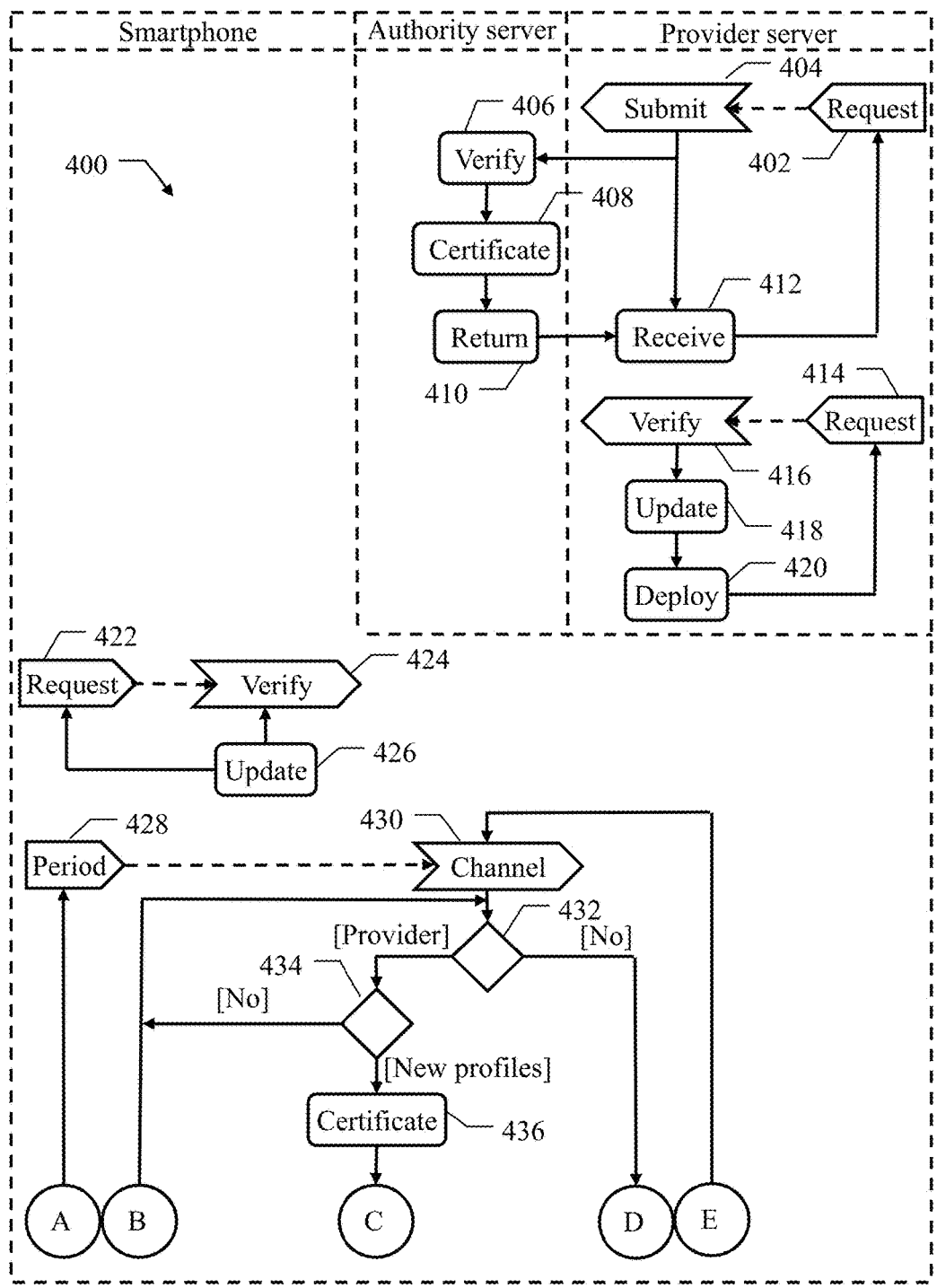
FIGS. 4A-4D show an activity diagram describing embodiments of the present invention.
Figure 4B:
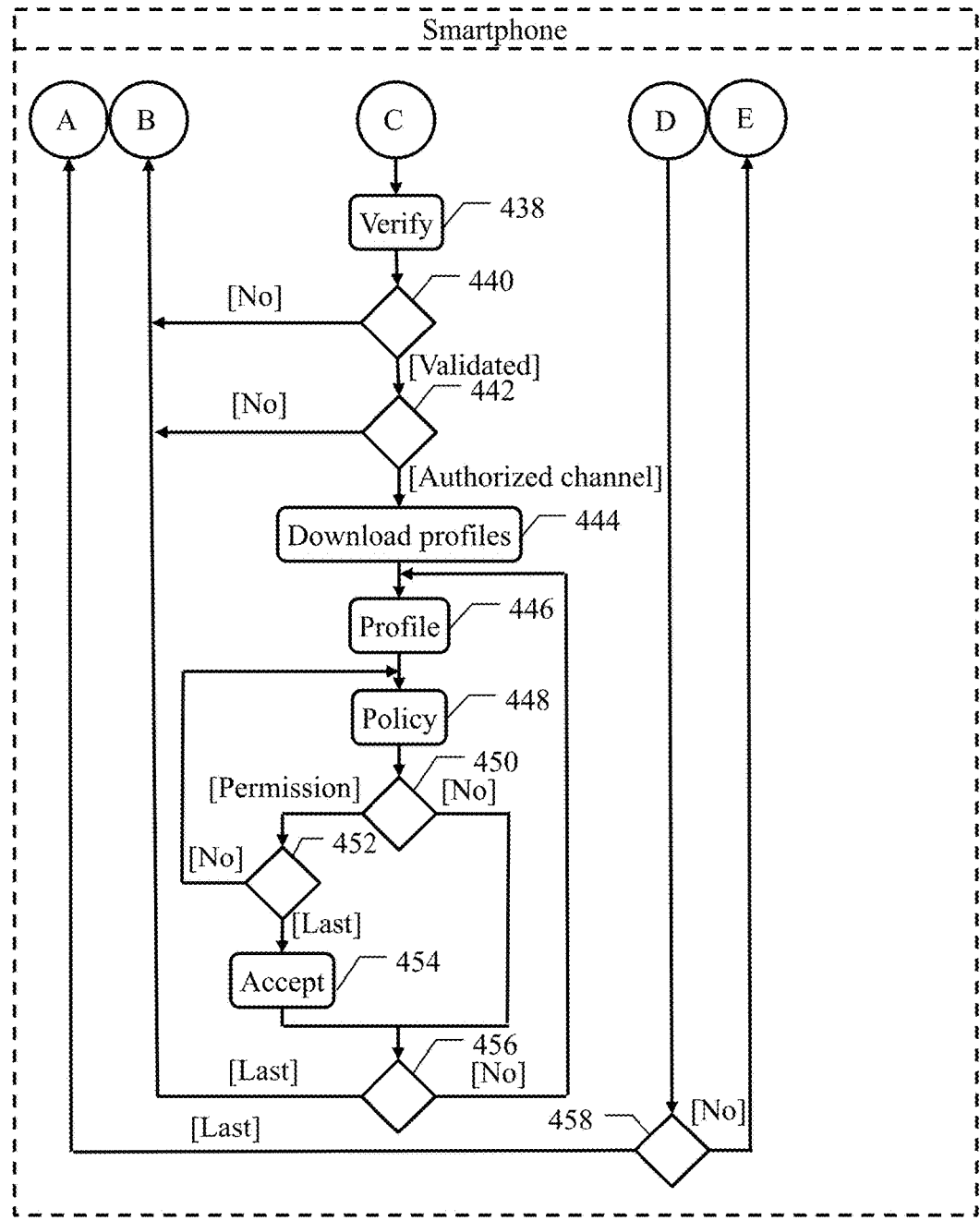
Figure 4C:
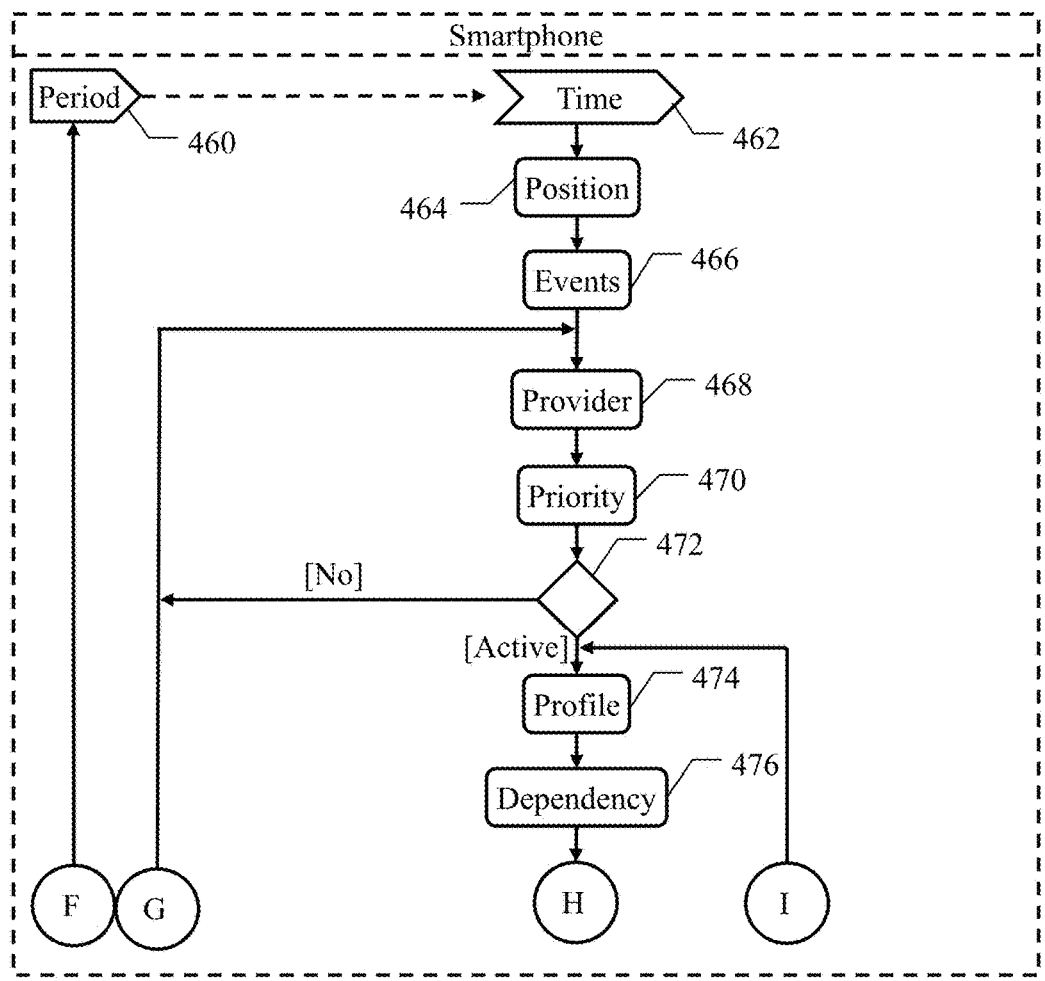
Figure 4D:
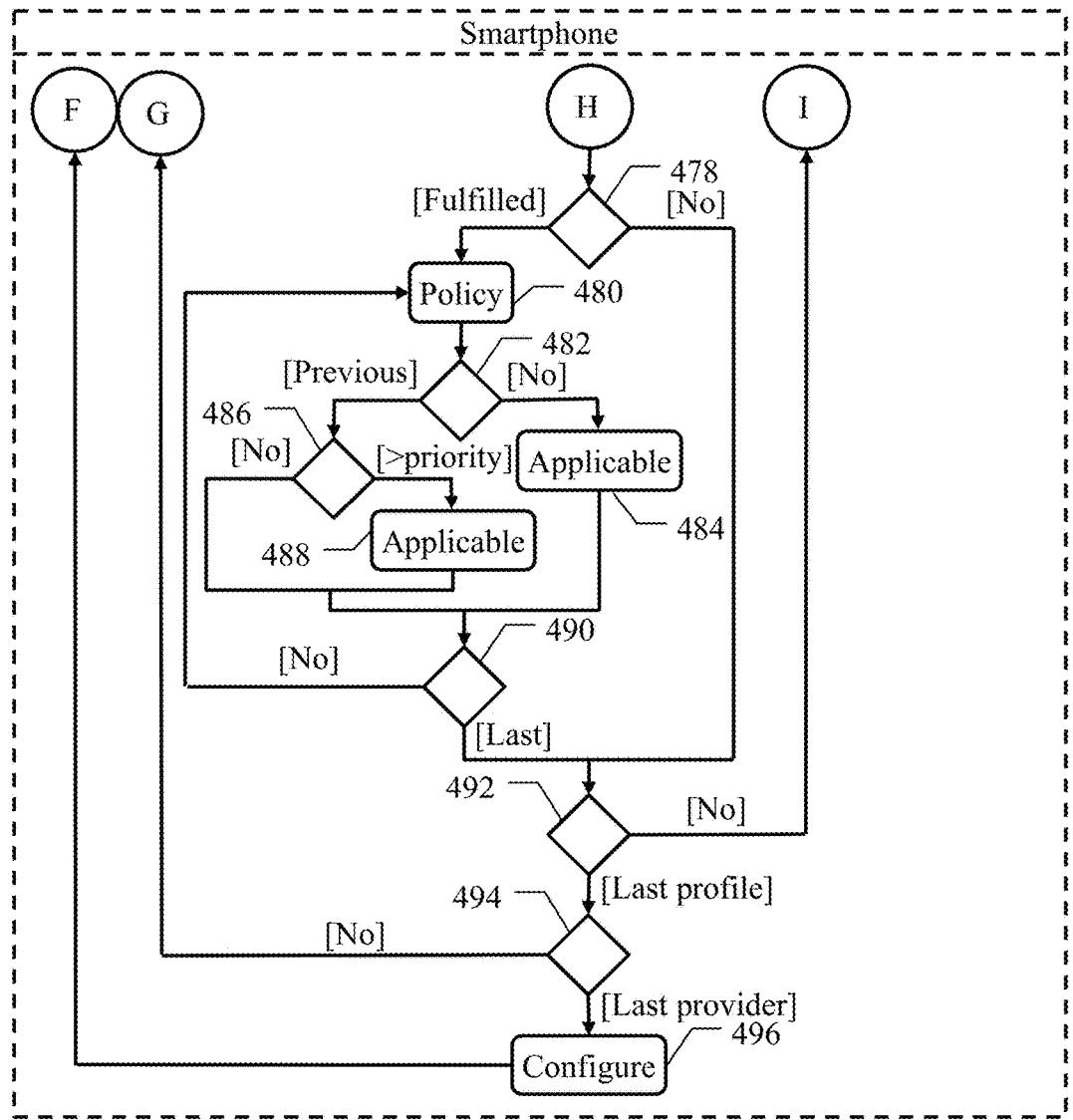

FIG. 3 shows software components used to implement embodiments of the present invention.

All the software components (programs and data) are denoted as a whole with the reference 300. The software components 300 are typically stored in the mass memory and loaded (at least partially) into the working memory of the smartphones 105, the provider servers 210 and the authority server 215 when the programs are running, together with an operating system and other application programs (not shown in FIG. 3). The programs may be initially installed into the mass memory, for example, from removable storage units or from the telecommunication network. In this respect, each program may be a module, segment or portion of code, which comprises one or more executable instructions for implementing the specified logical function.

The authority server 215 comprises the following components. A certification service 305 is used to certify the providers. The certification service 305 controls (in read/write mode) a global certificate repository 310, which stores corresponding (digital) certificates of the providers issued by the authority. Each certificate indicates several characteristics of the provider that are certified by the authority. Particularly, the certificate attests an identity of the provider; for this purpose, the certificate comprises an identifier of the provider (for example, a domain name thereof) and its public key, corresponding to a private key owned by the provider. The certificate attests a priority rule that has been assigned by the authority to the provider for evaluating its priority. The priority may range within a predefined range, with an end value thereof (for example, zero) that corresponds to a deactivation of the provider. For example, the priority rule indicates a default value of the priority and how the priority changes according to one or more real-time conditions. For example, the real-time conditions depend on time (such as changing between working hours and non-working hours), position (such as changing between inside and outside a restaurant) and/or events (such as changing when a natural disaster occurs). In the latter case (i.e., events), the certificate also indicates how the events are detected (for example, by SMSs (i.e., Short Message Services) from certified telephone numbers or by activities in reliable social networks). The certificate attests that one or more communication channels have been authorized by the authority to the provider for deploying the provider's policies. For example, the policies may be deployed via mobile telephone networks (such as of 4G type), wireless networks (such as of Wi-fi type), proximity communications (such as of NFC type). The certificate attests that the permissions have been granted by the authority to the provider for setting one or more features of the smartphones. The features are any resource of hardware type (for example, camera, loudspeaker), of software type (for example, apps, files), of logical type (for example, contacts, billing schemas) or of functional type (for example, inbound calls, outbound calls). The permissions grant specific control rights on these features to the provider (for example, enabling/disabling camera, ringtone, apps, access to files, access to contacts, billing schemas, inbound calls, outbound calls). For example: the user may be authorized to set the billing to the user's account, to block calls, to control sharing of the position and to prevent access to contents; a company may be authorized to set the billing to the company's account and to control the ringtone; a restaurant may be authorized to control the ringtone; the civil protection may be authorized to control the camera. As a result, the certificate implements a general mechanism that enables the authority to grant authorizations to the provider (i.e., in terms of privileges with respect to other providers defined by the provider's priority, ways of deploying the policies defined by the provider's communication channels and actions that may be performed on the smartphones 105 defined by the provider's permissions), in such a way that is trusted by the smartphones 105.

Each provider server 210 (only one provider server 210 is shown in FIG. 3), comprises the following components. An enroller 315 is used to enroll the provider with the authority via the enroller 315 accessing the certification service 305. Moreover, the enroller 315 accesses write mode) a certificate file 320 storing the certificate that has been issued by the authority to the provider. The certificate comprises the provider's priority rule, communication channels and permissions. A configuration manager 325 is used to control the configuration of the smartphones 105. The configuration manager 325 accesses (in read mode) the certificate file 320. Moreover, the configuration manager 325 accesses (in read/write mode) a global profile repository, which stores one or more profiles that are defined by the provider for the smartphones 105. Each profile indicates a possible dependency and one or more policies. In turn, each policy indicates one or more features of the smartphone and respective settings pertaining to the one or more features. The dependency enables the application of the policies of the profile when the dependency is fulfilled. The dependency is based on one or more (further) real-time conditions. For example, the dependency may be based on an activation of the profile (for example, entered manually by the user or received in a corresponding message from the provider), and is based as above on time (such as enabling the application of the profile in a specific period), position (such as enabling the application of the profile in a specific area) and/or events (such as enabling the application of the profile when a specific event occurs). A deployer 335 is used to deploy the profiles to the smartphones 105 (using the communication channels indicated in the certificate of the provider). The deployer accesses (in read mode) the certificate file 320 and the global profile repository 330.

Each smartphone 105 (only one smartphone shown in FIG. 3), comprises the following components. A configuration agent 340 is used to receive the profiles from the providers. For this purpose, the configuration agent 340 may interact with the deployer 335 of each provider. The configuration agent 340 accesses (in write mode) a local profile repository 345 and a local certificate repository 350. The local profile repository 345 stores the (current) profiles that have been received by the smartphone 105. The local certificate repository 350 stores the certificates of the corresponding (current) providers. A configuration interface 355 is used to view, create, update or delete one or more further profiles by the user of the smartphone 105 (acting as an additional provider). The configuration interface 355 accesses (in read/write mode) the local profile repository 350. Moreover, the configuration agent 340 exploits a validator 360, which is used to validate: the providers (e.g., to recognize the providers), the priority rules of the providers (to evaluate the priorities of the providers), the communication channels of the providers (to accept the corresponding profiles of the providers though the communication channels), and the profiles of the providers (to permit application of the profiles). An applier 365 is used to apply the profiles onto the smartphone 105. The applier 365 accesses (in read mode) the local profile repository 345 and the local certificate repository 350. Moreover, the applier 365 exploits an evaluator 370, which is used to evaluate the priorities of the providers and the dependencies of the profiles. The applier 365 and the evaluator 370 exploit one or more drivers 375 of the peripheral units of the smartphone 105.

FIGS. 4A-4D show an activity diagram describing embodiments of the present invention.

Particularly, FIG. 4 represents an exemplary process that may be used to control operation of the smartphones with a method 400. In this respect, each block in FIG. 4 may correspond to one or more executable instructions for implementing the specified logical function on the corresponding control units or on the smart portable device of the user.

Starting from the swim-lane of a generic provider server, the process passes from block 402 to block 404 every time the corresponding provider submits a request for updating enrollment of the provider with the authority (through a user interface of the enroller). For example, the provider may request to enroll with the authority, to update: the provider's identifier, priority rule, communication channels; and ways to detect the corresponding events and/or permissions.

Moving to the swim-lane of the authority server, at block 406, the certification service receives the request of the provider and in response, the authority verifies whether the request of the provider may be accepted. Assuming that the request of the provider is acceptable, the certification service at block 408 creates a corresponding certificate for the provider (and saves the corresponding certificate into the corresponding repository). Particularly, if the provider is new, a corresponding pair of private key and public key is generated. In any case, the authority server creates the certificate with the relevant information of the provider (i.e., identifier, public key, priority rule, communication channels, ways to detect the events and permissions) and signs the certificate with the private key of the authority. The certification service at block 410 then returns this certificate to the provider server.

Referring back to the swim-lane of the provider server, the enroller receives the certificate at block 412 (and saves the certificate into the corresponding file). The process then returns to the block 402 waiting for a next request of updating the enrollment of the provider with the authority.

In a completely independent way, the process passes from block 414 to block 416 (in the swim-lane of the provider se every time the provider submits a request for updating the provider's profiles (through a user interface of the configuration manager). Particularly, the provider may request to create, update or delete the profiles globally or at the level of their policies. For example, a company may define a "work" profile with policies for billing to its account, hiding contents flagged as personal, allowing calls from contacts in a work group only and with a dependency on working hours, and a "meeting" profile with policies for turning the ringtone to silent mode, allowing calls from contacts in a manager group only and with a dependency on a reset signal from a proximity apparatus at the entry of every meeting room, a restaurant may define a corresponding profile with a policy for lowering the ringtone and with a dependency on a reset signal from a proximity apparatus at the entry thereof, and the civil protection may define a corresponding profile with a policy for disabling the camera and with a dependency on a position within an area of a natural disaster indicated in a corresponding message. In response thereto, the configuration manager verifies a compliance of the request with the authorizations of the provider (as indicated by its certificate in the corresponding file), i.e., whether the setting of the feature of each policy is permitted. Assuming that the request of the provider is acceptable, the configuration manager at block 418 updates the profile repository accordingly. Moreover, the deployer at block 420 makes any profiles that have been updated available for deployment to the smartphones in one or more of its communication channels (for example, the "work" and "meeting" profiles in corresponding access points, the profile of the restaurant in corresponding proximity apparatuses and the profile of the civil protection in hot spots and one or more mobile telephone networks). The process then returns to the block 414 waiting for a next request of updating the profiles.

With reference now to the swim-lane of a smartphone 105, the process passes from block 422 to block 424 every time the user (after authenticating with the user's userId and password) submits a request for updating the user's profiles (through a user interface of the configuration agent). In one embodiment the user is a provider 110. As above, the user may request to create, update or delete the user's profiles globally or at the level of policies of the profiles (with the possibility of enabling or disabling the profiles manually thereby making dependencies of the profiles always f or not fulfilled, respectively). For example, a "home" profile may be defined by a policy for billing to an account of the user, a "vacation" profile may be defined by policies for blocking calls from contacts in a work group and for preventing sharing of the position, and a "kids" profile may be defined by a policy for blocking access to contents flagged. for adults. In the preceding examples, the user may enable the "home" profile alone in general, the "home" and "vacation" profiles when the user is vacationing, or the "home", "vacation" and "kids" profiles when the user gives the smartphone to the children. In response thereto, the configuration manager verifies a compliance of the request with the authorizations of the user (as indicated by the user's certificate in the corresponding file); i.e., whether the setting of the feature of each policy is permitted. Assuming that the request of the user is acceptable, the configuration manager at block 426 updates the profile repository accordingly. The process then returns to the block 422 waiting for a next request of updating the profiles.

In a completely independent way, the process passes from block 428 to block 430 as soon as a predefined period expires (for example, every 1-2 seconds). In response thereto, a loop is entered for processing the communication channels that are supported by the smartphone. The loop begins with the configuration agent that takes a (current) communication channel into account, for example, in increasing order of coverage (such as proximity communications, wireless networks and mobile telephone networks). Continuing to block 432, the configuration agent verifies whether any provider still to be processed is active on the communication channel. If so, the configuration agent at block 434 verifies whether any (new) profiles of the provider are still to be received by the smartphone (as indicated in the local profile repository). The new profiles may also be filtered according to the dependencies of the profiles, for example, by taking into account only the new profiles that may be enabled according to one or more real-time conditions (such as the current position of the smartphone and/or the current time), so as to reduce the traffic on the communication channel. If one or more new profiles of the provider (which may be enabled) are still to be received by the smartphone, the configuration agent at block 436 downloads the certificate of the provider (from the provider server), if necessary (i.e., if the certificate is missing or is not up-to-date in the corresponding repository). The validator at block 438 then verifies the validity of this certificate with the authority server, i.e., whether the certificate has been signed with the private key of the authority (by using its public key) and whether the certificate has not expired. The flow of activity then branches at block 440 according to a result of this verification. If the certificate has been validated correctly, the process continues at block 442. At block 442, the validator verifies whether the provider is authorized to use the communication channel (as indicated in the provider's certificate). If the provider is authorized to use the communication channel, the configuration agent at block 444 downloads the new profiles of the provider (from the provider server). A loop is then entered for verifying the new profiles of the provider. The loop begins at block 446 wherein the validator takes a (current) new profile into account (for example, in increasing order of the creation time of the new profiles). A further loop is then entered for verifying the policies of the new profile. The loop begins at block 448 wherein the validator takes a (current) policy of the new profile into account (in any arbitrary order). Continuing to block 450, the validator determines whether the provider has permission to set the feature of the policy (as indicated in the provider's certificate). If the provider has the permission to set the feature, the validator at block 452 verifies whether a last policy of the new profile has been verified. If not, the flow of activity returns to the block 448 to repeat the same operations on a next policy of the new profile. Conversely (once all the policies of the new profile have been validated correctly), the loop for verifying the policies of the new profile is exit by descending into block 454; at this point, the validator adds the new profile (being correctly validated) to the local profile repository (a purging procedure, not shown in the figure, may also be implemented to delete the profiles and the certificates of their providers periodically, for example, when they have not been used for a long time). The loop for verifying the new profile is then exit by descending into block 456; the same point is also reached directly from the block 450 (without performing any further action) if the provider has not the permission to set the feature of the policy, so that the whole new profile is discarded. The validator now verifies whether a last new profile of the provider has been verified. If not, the flow of activity returns to the block 446 to repeat the same operations on a next new profile of the provider. Conversely (once all the new profiles of the provider have been verified), the process returns to the block 432 to verify again whether any provider still to be processed is active on the communication channel. Block 432 is also reached directly from the block 434 (when all the profiles of the provider on the communication channel have already been received by the smartphone), from the block 440 (when h provider is refused since the provider's certificate has not been validated) or from the block 442 (when the provider is refused since the provider is not authorized to use the communication channel). As soon as no provider remains to be processed (always true when no provider is active on the communication channel), the corresponding loop is exited by descending into block 458. At block 458, the configuration agent verifies whether a last communication channel of the smartphone has been processed. If not, the flow of activity returns to the block 430 to repeat the same operations on a next communication channel of the smartphone. Conversely (once all the communication channels of the smartphone have been processed), the corresponding loop is exited by returning to the block 428 for repeating the same operations periodically.

In a completely independent way, the process passes from block 460 to block 462 as soon as another predefined period expires (for example, every 1-2 seconds). In response, the evaluator determines the real-time conditions (which may affect the priorities of the providers and/or the dependencies of the profiles). Particularly, the evaluator determines a current time (for example, date and time provided by a system clock of the smartphone). The evaluator at block 464 determines a current position of the smartphone (for example, geographical coordinates provided by the driver of the GPS receiver or a corresponding area defined by a beacon signal of an access point or a reset signal of a proximity apparatus). The evaluator at block 466 determines any events that may be relevant for the real-time conditions (as indicated b certificates and the profiles in the corresponding repositories). Particularly, the events may be certified messages that are received from the providers (for example, via SMSs from corresponding telephone numbers indicated in their certificates). In addition or in alternative, the events may be the result of a cognitive process based on reliable social activities (for example, messages exchanged in social networks indicated in the certificates).

A loop is then entered for processing the providers of the smartphone, from which one or more profiles have been downloaded (as indicated by the certificates of the providers in the corresponding repository). The loop begins at block 468, wherein the evaluator takes a (current) one of the providers of the smartphone into account (for example, in increasing order of the addition of the certificates of the providers to the corresponding repository). Continuing to block 470, the evaluator determines the priority of the provider according to the evaluator's priority rule (retrieved from its certificate in the corresponding repository). For example, the evaluator initializes the priority to its default value. The evaluator then changes the priority according to the current time (for example, increasing the priority of a company during the working hours and increasing the priority of the user outside the working hours), according to the current position (for example, increasing the priority of a restaurant when the smartphone is within the restaurant) and/or according to the events (for example, increasing the priority of the civil protection when the smartphone is in the area of a natural disaster).

A test is then made at block 472, wherein the applier verifies the priority of the provider. If the priority of the provider is different from zero (meaning that the provider is active), the process descends into block 474. At this point, a loop is entered for processing the profiles of the provider (extracted from the corresponding repository). The loop begins with the applier that takes a (current) profile of the provider into account (in any arbitrary order). Continuing to block 476, the evaluator verifies the dependency of the profile (if any) according to the real-time conditions. For example, the application of the profile may be enabled in response to the profile's activation, during the working hours or during the non-working hours, within a meeting room or a restaurant, when a natural event occurs. The flow of activity then branches at block 478 according to a result of this verification in step 476. Particularly, if the dependency of the profile is fulfilled or the profile has no dependency (meaning that the profile may be applied onto the smartphone) a further loop is entered for processing the profile's policies. The loop begins at block 480, wherein the applier takes a (current) policy of the profile into account. Continuing to block 482, the applier verifies whether the feature of the current policy has already been set by a previous policy (already processed). If not, the applier at block 484 flags the policy as applicable (for example, by asserting a corresponding variable in a mask, initialized with the variables of all the policies that are deasserted). Conversely, the applier at block 486 verifies whether the priority of the provider of the current policy is (possibly strictly) higher than the priority of the provider of the previous policy. If so, the applier at block 488 flags the previous policy as non-applicable any longer (by deasserting the corresponding variable in the mask) and flags the current policy as applicable in place of the previous policy (by asserting the corresponding variable in the mask). The flow of activity then descends into block 490 from the block 484, from the block 488 or directly from the block 486 when the priority of the provider of the current policy is not (possibly strictly) higher than the priority of the provider of the previous policy (so that the previous policy remains non-applicable). As a consequence, in case of any conflict among the settings of the same feature by different policies, the policies are applied according to the priorities of their providers (with the oldest provider that prevails in case of equal priorities). At this point, the applier verifies whether a last policy of the profile has been processed. If not, the flow of activity returns to the block 480 to repeat the same operations on a next policy of the profile. Conversely (once all the policies of the profile have been processed), the corresponding loop is exited by descending into block 492 which is also reached directly form the block 478 when the dependency of the profile is not fulfilled (so that it is not applicable at all). The applier now verifies whether a last profile of the provider has been processed. If not, the flow of activity returns to the block 474 to repeat the same operations on a next profile of the provider. Conversely (once all the profiles of the provider have been processed), the corresponding loop is exited by descending into block 494. The applier now verifies whether a last provider of the smartphone has been processed. If not, the flow of activity returns to the block 468 to repeat the same operations on a next provider of the smartphone. Block 468 is also reached directly from the block 472 when the priority of the provider is zero (meaning that the provider is inactive). Conversely (once all the providers of the smartphone have been processed), the corresponding loop is exited by descending into block 496. The applier now configures the smartphone according to the policies that have been determined to be applicable at the moment (as flagged in the mask), so that the applier configures the feature of each applicable policy according to each applicable policy's setting (if necessary).

The flow of activity then returns to the block 460 for repeating the same operations periodically.

In order to satisfy local and specific requirements, a person skilled in the art may apply many logical and/or physical modifications and alterations to the present invention. More specifically, although this invention has been described with a certain degree of particularity with reference to one or more embodiments thereof, it should be understood that various omissions, substitutions and changes in the form and details as well as other embodiments are possible. Particularly, different embodiments of the present invention may even be practiced without the specific details (such as the numerical values) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any embodiment of the present invention may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling operation of a computing device. However, the computing device may be of any type (see below).

In an embodiment, the method comprises receiving an indication of a plurality of policies. However, the policies may be in any number and received in any way (for example, downloaded or entered manually).

In an embodiment, the policies are provided by a plurality of providers. However, the providers may be in any number and of any type (for example, users, remote entities or any combination thereof).

In an embodiment, the providers have corresponding priorities. However, the priorities may be of any type (for example, dynamic or static).

In an embodiment, the policies comprise an indication of corresponding settings of one or more features of the computing device. However, the policies may relate to any number and types of features (for example, of hardware, software, logical and/or functional type) and to any setting thereof (for example, controlling access, use, operation), with the policies that may be managed at any level (for example, individually, grouped into profiles or any combination thereof).

In an embodiment, the method comprises validating the providers with at least one authority. However, the authorities may be in any number and of any type (for example, public or private institutions). Moreover, the providers may be validated in any way (for example, with certificates, exchanged messages).

In an embodiment, the authority certifies the priorities and permissions of the providers to set the features of the policies thereof. However, the authority may certify the providers in any way (for example, individually or at the level of categories thereof).

In an embodiment, the method comprises determining one or more applicable settings among the settings of the features of the policies according to the priorities of the corresponding providers being validated. However, the applicable settings may be determined in any way (for example, resolving conflicts with equal priority according to the age of the providers and/or of the profiles, manually).

In an embodiment, the method comprises configuring the computing device to operate according to the applicable settings of the features. However, the computing device may be configured in any way (for example, automatically or requesting an approval of the user at least in specific cases, locally at the level of the computing device and/or globally at the level of a remote computing machine such as of a telephone operator).

In an embodiment, the method comprises validating the providers with said at least one authority certifying corresponding priority rules of the providers for evaluating the priorities thereof according to one or more real-time conditions. However, the priority rules may be certified in any way (either the same as or different from above). The priority rules may be of any type and they may be based on any number and type of real-time conditions (for example, times, positions, events or any combination thereof).

In an embodiment, the method comprises evaluating the priorities of the providers according to the corresponding priority rules of the providers being validated. However, the priorities may be evaluated in any way (for example, locally and/or globally).

In an embodiment, said step of receiving an indication of a plurality of policies comprises receiving at least part of the policies being downloaded from corresponding remote computing machines associated with one or more remote entities. However, the policies may be downloaded in any way (for example, in push or pull mode, selectively according to any number and type of real-time conditions or indiscriminately) from any number and type of remote computing machines (for example, physical servers, virtual servers, cloud services). Moreover, the remote entities may be in any number and of any type (for example, companies, any public places such as restaurants, coffee shops and cinemas, museums, airlines, telephone operators, any institutions such as civil protection, police).

In an embodiment, the step of receiving an indication of a plurality of policies comprises receiving at least part of the policies being entered by one or more users of the computing device. However, the policies may be entered in any way (for example, typed or copied). Moreover, the users may be in any number and of any type (for example, owner of the computing device, hi s/her wife/husband, children).

In an embodiment, the method comprises validating the providers with said at least one authority certifying corresponding authorizations of the providers to provide the policies thereof via one or more communication channels. However, the communication channels may be authorized in any way (either the same as or different from above). Moreover, each provider may be authorized to use any number and type of communication channels, up to all the available ones (for example, defined generally by their categories or specifically by further characteristics such as apparatuses, positions, times).

In an embodiment, the method comprises receiving the indication of the policies from each of the providers via at least one of the communication channels of the provider being validated that is supported by the computing device. However, the communication channels may be in any number and of any type (for example, mobile telephone networks, wireless networks, proximity communications, SMSs, Bluetooth connections). Moreover, each provider may use any number of its communication channels (for example, selectively for each profile or generally, up to all of them always).

In an embodiment, said step of receiving the indication of the policies comprises receiving the indication of the policies from one or more mobile telephone networks, one or more access points and/or one or more proximity apparatuses. However, the policies may be received from any mobile telephone networks (for example, LTE, HSDPA, UMTS, Edge), from any access points (for example, private access points, hot spots), from any proximity apparatuses (for example, NEC, RFID).

In an embodiment, said determining one or more applicable settings comprises verifying an applicability of at least part of the policies according to one or more real-time conditions. However, the applicability of the policies may depend on any number and type of real-time conditions (either the same as or different from above). In any case, the policies may also be unconditioned (in part or completely).

In an embodiment, said verifying an applicability of at least part of the policies comprises verifying a manual enabling of at least part of the policies. However, the policies may be enabled/disabled in any way (for example, individually or at the level of profiles, manually or automatically). In any case, the policies may also be always enabled (in part or completely).

In an embodiment, the method comprises evaluating an activation of at least part of the providers according to one or more real-time conditions. However, the activation of the providers may depend on any number and type of real-time conditions (either the same as or different from above). In any case, the providers may also be always active (in part or completely).

In an embodiment, the method comprises detecting a current time contributing to define the real-time conditions. However, the current time may be detected in any way (for example, through a systems clock or a remote service); moreover, the current time may contribute to define the real-time conditions in any way (for example, by specific or recurring hours, days, holidays).

In an embodiment, the method comprises detecting a current position of the computing device contributing to define the real-time conditions. However, the current position may be detected in any way (for example, through the GPS receiver, the access points, the mobile telephone network). Moreover, the current position may contribute to define the real-time conditions in any way (for example, by areas, cities, regions, countries, premises).

In an embodiment, the method comprises detecting an indication of one or more events contributing to define the real-time conditions. However, the events may be in any number and of any type (for example, natural disasters, demonstrations, accidents) and the events may be detected in any way (for example, according to corresponding notifications, social activities or any combination thereof). Moreover, the events may contribute to define the real-time conditions in any way (for example, alone or in combination with the positions of the events, for a predefined time or up to a notification of termination of the events).

In an embodiment, the step of detecting an indication of one or more events comprises validating the providers with said at least one authority certifying corresponding notifications over a telecommunication network for detecting the indication of the events. However, the notifications may be certified in any way (either the same as or different from above). Moreover, each provider may be authorized to use any number and type of notifications (for example, SMSs, operating system notifications, e-mails) over any telecommunication network (see below).

In an embodiment, the step of detecting an indication of one or more events comprises validating the providers with said at least one authority certifying corresponding social activities over a telecommunication network for detecting the indication of the events. However, the social activities may be certified in any way, (either the same as or different from above). Moreover, the social activities may be in any number and type for the providers, either individually or globally (for example, messages, comments, ratings in social networks, bulletin boards, discussions), over any telecommunication network (either the same as or different from above).

In an embodiment, the step of detecting an indication of one or more events comprises detecting the indication of the events according to the corresponding notifications of the providers being validated. However, the notifications may be received in any way (for example, in push or in pull mode).

In an embodiment, the step of detecting an indication of one or more events comprises detecting the indication of the events according to the corresponding social activities of the providers being validated. However, the events may be determined in any way according to the social activities (for example, by natural language processing techniques, queries based on keywords, hashtags).

Generally, similar considerations apply if the same solution is implemented with an equivalent method (by using similar steps with the same functions of more steps or portions thereof, removing some steps being non-essential, or adding further optional steps). Moreover, the steps may be performed in a different order, concurrently or in an interleaved way (at least n part).

An embodiment provides computer programs configured for causing the computing device to perform the above-mentioned method. An embodiment provides a computer program product comprising a computer readable storage medium having program instructions em bodied therewith, the program instructions executable by the computing device to cause the computing device to perform the same method. However, the software program may be implemented as a stand-alone module, as a plug-in for a pre-existing software program (for example, the operating system of the computing device), or even directly in the latter. In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

An embodiment provides a system comprising means configured for performing the steps of the above-mentioned methods. An embodiment provides a system comprising a circuitry (i.e., any hardware suitably configured, for example, by software) for performing each step of the same methods. Particularly, different embodiments provide the computing device, the provider server, the authority server or their combination, respectively. However, the computing device may be of any type (for example, a smartphone, a tablet, a laptop or any other computer), the provider server and the authority server may be of any type (for example, a physical computing machine, a virtual computing machine, a cloud service) and the whole system may comprise any number of computing devices, provider servers and authority servers communicating among them via any network (for example, of local, wide area, global, cellular or satellite type).

Generally, similar considerations apply if the computing device, the provider server, the authority server and the whole system each has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous and may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computing system to implement the methods of the present invention.

A computing system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for controlling operation of a computing device, wherein the method comprises:
   determining, by the computing device, one or more applicable settings among settings of one or more features of the computing device, said settings being indicated by policies provided by a plurality of providers according to priorities of corresponding providers for application of corresponding policies of the providers, said policies comprising an indication of corresponding settings of the one or more features of the computing device, wherein the providers are validated with at least one authority, said at least one authority having certified the priorities of the providers and permissions of the providers to set the features of the policies; and
   configuring, by the computing device, the computing device to operate according to the applicable settings of the features.

2. The method of claim 1, wherein the providers are validated with the at least one authority, said at least one authority having certified priority rules for the providers, said rules being for evaluating the priorities according to one or more real-time conditions, and wherein the method comprises:
   evaluating, by the computing device, the priorities of the providers according to the corresponding priority rules of the providers.

3. The method of claim 2, wherein the method comprises:
   detecting, by the computing device, a current time contributing to define the real-time conditions.

4. The method of claim 2, wherein the method comprises:
   detecting, by the computing device, a current position of the computing device contributing to define the real-time conditions.

5. The method of claim 2, wherein the method comprises:
   detecting, by the computing device, an indication of one or more events contributing to define the real-time conditions.

6. The method of claim 5, wherein said detecting an indication of one or more events comprises:
   validating the providers with said at least one authority certifying corresponding notifications and/or social activities over a telecommunication network for detecting the indication of the events; and
   detecting the indication of the events according to the corresponding notifications and/or social activities of the providers.

7. The method of claim 1, wherein said receiving an indication of a plurality of policies comprises:
   receiving at least part of the policies being downloaded from corresponding remote computing machines associated with one or more remote entities.

8. The method of claim 1, wherein said receiving an indication of a plurality of policies comprises:
   receiving at least part of the policies being entered by one or more users of the computing device.

9. The method of claim 1, wherein the providers are validated with the at least one authority having certified corresponding authorizations of the providers to provide the policies via one or more communication channels, and wherein the method comprises:
   receiving the indication of the policies from each provider via at least one of the communication channels of the respective provider.

10. The method of claim 9, wherein said receiving the indication of the policies comprises:
    receiving the indication of the policies from one or more mobile telephone networks, one or more access points, and/or one or more proximity apparatuses.

11. The method of claim 1, wherein said determining one or more applicable settings comprises:
    verifying an applicability of at least part of the policies according to one or more real-time conditions.

12. The method of claim 11, wherein said verifying an applicability of at least part of the policies comprises:
    verifying a manual enabling of at least part of the policies.

13. The method of claim 1, wherein the method comprises:
    evaluating, by the computing device, an activation of the profile of at least part of the providers according to one or more real-time conditions.

14. A computer program product, comprising one or more computer readable hardware storage devices having computer readable program code stored therein, said program code containing instructions executable by a computing device to implement a method for controlling operation of a computing device, said method comprising:

determining, by the computing device, one or more applicable settings among settings of one or more features of the computing device, said settings being indicated by policies provided by a plurality of providers according to priorities of corresponding providers for application of corresponding policies of the providers, said policies comprising an indication of corresponding settings of the one or more features of the computing device, wherein the providers are validated with at least one authority, said at least one authority having certified the priorities of the providers and permissions of the providers to set the features of the policies; and configuring, by the computing device, the computing device to operate according to the applicable settings of the features.

15. The computer program product of claim 14, wherein the providers are validated with the at least one authority, said at least one authority having certified priority rules for the providers, said rules being for evaluating the priorities according to one or more real-time conditions, and wherein the method comprises:

evaluating, by the computing device, the priorities of the providers according to the corresponding priority rules of the providers.

16. The computer program product of claim 14, wherein said receiving an indication of a plurality of policies comprises:

receiving at least part of the policies being downloaded from corresponding remote computing machines associated with one or more remote entities.

17. The computer program product of claim 14, wherein said receiving an indication of a plurality of policies comprises:

receiving at least part of the policies being entered by one or more users of the computing device.

18. A computing system, comprising a computing device that includes one or more processors, one or more memories; and one or more computer readable hardware storage devices, said one or more hardware storage devices containing program code executable by the one or more processors via the one or more memories to implement a method for controlling operation of a computing device, said method comprising:

receiving, by the computing device, an indication of a plurality of policies provided by a plurality of providers, said providers having corresponding priorities for application of corresponding policies of the providers, said policies comprising an indication of corresponding settings of one or more features of the computing device, wherein the providers are validated with at least one authority, said at least one authority having certified the priorities of the providers and permissions of the providers to set the features of the policies;

determining, by the computing device, one or more applicable settings among settings of one or more features of the computing device, said settings being indicated by policies provided by a plurality of providers according to priorities of corresponding providers for application of corresponding policies of the providers, said policies comprising an indication of corresponding settings of the one or more features of the computing device, wherein the providers are validated with at least one authority, said at least one authority having certified the priorities of the providers and permissions of the providers to set the features of the policies; and configuring, by the computing device, the computing device to operate according to the applicable settings of the features.

19. The computing system of claim 18, wherein the providers are validated with the at least one authority, said at least one authority having certified priority rules for the providers, said rules being for evaluating the priorities according to one or more real-time conditions, and wherein the method comprises:

evaluating, by the computing device, the priorities of the providers according to the corresponding priority rules of the providers.

20. The computing system of claim 18, wherein said receiving an indication of a plurality of policies comprises:

receiving at least part of the policies being downloaded from corresponding remote computing machines associated with one or more remote entities.

* * * * *